United States Patent
Bicknell

(10) Patent No.: US 9,797,617 B2
(45) Date of Patent: Oct. 24, 2017

(54) HVAC SYSTEM WITH SELECTIVE FLOWPATH

(71) Applicant: Trane International Inc., Piscataway, NJ (US)

(72) Inventor: Kirby Neal Bicknell, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 643 days.

(21) Appl. No.: 14/170,162

(22) Filed: Jan. 31, 2014

(65) Prior Publication Data

US 2014/0216685 A1  Aug. 7, 2014

Related U.S. Application Data

(60) Provisional application No. 61/762,204, filed on Feb. 7, 2013.

(51) Int. Cl.
*F24F 7/00* (2006.01)
*F24F 11/00* (2006.01)
*F24F 3/044* (2006.01)

(52) U.S. Cl.
CPC .......... *F24F 11/0076* (2013.01); *F24F 3/044* (2013.01); *Y02B 30/767* (2013.01)

(58) Field of Classification Search
CPC .......... F24F 3/044; F24F 5/00; F24F 11/0076; Y02B 30/767
See application file for complete search history.

(56) References Cited

U.S. PATENT DOCUMENTS

| | | | | |
|---|---|---|---|---|
| 1,937,238 A | * | 11/1933 | Mahon | F24F 3/044 126/113 |
| 1,991,280 A | * | 2/1935 | Hynes | F24H 3/0405 392/349 |
| 2,063,960 A | * | 12/1936 | Smith | F24F 3/044 12/146 D |
| 2,090,782 A | * | 8/1937 | Carraway | F24F 3/044 165/260 |
| 2,205,117 A | * | 6/1940 | Chambers | F24F 3/1405 165/101 |
| 2,352,930 A | * | 7/1944 | Anderson, Jr. | F25B 49/046 165/259 |
| 2,486,520 A | * | 11/1949 | Dahlman | B03C 3/00 55/358 |
| 2,547,657 A | * | 4/1951 | Olsen | F24F 3/044 165/254 |
| 2,702,994 A | * | 3/1955 | Borgerd | F24F 1/022 165/48.1 |
| 2,751,761 A | * | 6/1956 | Borgerd | F24D 17/02 62/160 |
| 2,913,229 A | * | 11/1959 | Hood | F24F 5/00 165/48.1 |
| 3,308,805 A | * | 3/1967 | Stockli | F24C 13/00 126/101 |

(Continued)

*Primary Examiner* — Ljiljana Ciric
(74) *Attorney, Agent, or Firm* — Conley Rose, P.C.; J. Robert Brown, Jr.

(57) ABSTRACT

A heating, ventilation, and/or air conditioning (HVAC) system includes: a furnace having a furnace heat exchanger; and an indoor HVAC unit having a refrigerant heat exchanger. At least one of a component of the furnace and a component of the indoor HVAC unit are selectively removable from an airflow path of the HVAC system.

7 Claims, 5 Drawing Sheets

(56) References Cited

U.S. PATENT DOCUMENTS

| | | | | |
|---|---|---|---|---|
| 3,332,475 A * | 7/1967 | Selhost | F24F 1/02 | 165/249 |
| 3,411,569 A * | 11/1968 | Hildreth | F24F 1/02 | 165/63 |
| 3,504,482 A * | 4/1970 | Goettl | B03C 3/68 | 200/81.9 R |
| 3,513,634 A * | 5/1970 | Angonese | B03C 3/66 | 55/493 |
| 3,540,526 A * | 11/1970 | Kautz | F24F 3/00 | 165/216 |
| 3,547,186 A * | 12/1970 | McGrath | F24F 1/02 | 165/221 |
| 3,648,766 A * | 3/1972 | Whalen | F24F 1/0007 | 165/253 |
| 3,654,747 A * | 4/1972 | Remick | B03C 3/40 | 55/467 |
| 3,722,580 A * | 3/1973 | Braver | F24F 1/0007 | 165/50 |
| 3,742,725 A * | 7/1973 | Berger | F24F 1/02 | 165/48.1 |
| 3,841,392 A * | 10/1974 | Osheroff | F15C 1/008 | 165/123 |
| 3,908,750 A * | 9/1975 | Siegel | F24F 1/0007 | 165/221 |
| 4,015,962 A * | 4/1977 | Tompkins | F24F 5/00 | 126/584 |
| 4,019,570 A * | 4/1977 | Siegel | F24F 1/0007 | 165/178 |
| 4,072,187 A * | 2/1978 | Lodge | F24F 13/20 | 165/137 |
| 4,127,162 A * | 11/1978 | Braver | F24F 13/20 | 123/65 R |
| RE30,245 E * | 4/1980 | Whalen | F24F 1/0007 | 165/207 |
| 4,250,956 A * | 2/1981 | Ohtani | B60H 1/00828 | 165/263 |
| 4,262,738 A * | 4/1981 | Kato | B60H 1/00964 | 165/265 |
| 4,274,581 A * | 6/1981 | Hays | F24D 3/18 | 165/300 |
| 4,462,460 A * | 7/1984 | Braver | F24F 1/0033 | 165/207 |
| 4,582,124 A * | 4/1986 | Yoshimi | B60H 1/00007 | 165/202 |
| 4,720,983 A * | 1/1988 | Mintz | F24F 1/027 | 62/228.1 |
| 4,802,405 A * | 2/1989 | Ichitani | B60H 1/00007 | 165/100 |
| 5,071,455 A * | 12/1991 | Abedi-Asl | B03C 3/017 | 126/110 R |
| 5,142,883 A * | 9/1992 | DeWitt | F24F 13/32 | 62/265 |
| 5,162,020 A * | 11/1992 | Asano | F24F 11/027 | 165/103 |
| 5,277,036 A * | 1/1994 | Dieckmann | F24F 3/044 | 165/76 |
| 5,299,431 A * | 4/1994 | Iritani | B60H 1/00021 | 62/159 |
| 5,332,028 A * | 7/1994 | Marris | F24D 15/04 | 165/233 |
| 5,533,357 A * | 7/1996 | Voorhis | F24F 1/027 | 62/277 |
| 5,598,715 A * | 2/1997 | Edmisten | F24F 3/153 | 236/44 C |
| 5,709,100 A * | 1/1998 | Baer | F25D 19/04 | 62/259.2 |
| 5,709,102 A * | 1/1998 | Fukumoto | B60H 1/00907 | 62/324.1 |
| 5,816,066 A * | 10/1998 | Aoki | B60H 1/0005 | 165/228 |
| 5,819,551 A * | 10/1998 | Fukumoto | B60H 1/00907 | 62/160 |
| 5,901,566 A * | 5/1999 | Macosko | F24F 13/22 | 62/285 |
| 6,065,296 A * | 5/2000 | Feger | F24F 13/32 | 3/32 |
| 6,109,044 A * | 8/2000 | Porter | F24F 1/0059 | 165/104.21 |
| 6,129,781 A * | 10/2000 | Okamoto | B03C 3/12 | 55/282.3 |
| 6,386,281 B1 * | 5/2002 | Ganesh | F24F 3/1405 | 165/252 |
| 6,427,454 B1 * | 8/2002 | West | F24F 3/153 | 62/176.1 |
| 6,604,688 B2 | 8/2003 | Ganesh et al. | | |
| 6,925,999 B2 * | 8/2005 | Hugghins | F23N 1/002 | 126/110 A |
| 6,986,387 B2 * | 1/2006 | Hancock | F24F 1/0007 | 165/103 |
| 7,161,316 B2 * | 1/2007 | Archer | H02P 7/28 | 318/432 |
| 7,263,850 B2 * | 9/2007 | Eom | F24F 1/0007 | 62/272 |
| 7,332,019 B2 * | 2/2008 | Bias | B03C 3/025 | 96/15 |
| 7,381,028 B2 * | 6/2008 | Hancock | F04D 17/02 | 29/888.022 |
| 7,601,204 B2 * | 10/2009 | Woodruff | B03C 3/017 | 95/73 |
| 7,703,295 B2 * | 4/2010 | Zangari | A47F 3/0404 | 62/298 |
| 8,254,295 B2 * | 8/2012 | Choi | H04L 5/0053 | 370/252 |
| 8,373,099 B2 * | 2/2013 | Lifson | H01M 8/04007 | 165/205 |
| 8,746,584 B2 * | 6/2014 | Helt | F24H 3/002 | 165/240 |
| 9,146,045 B2 * | 9/2015 | Miglio | F25B 1/00 | |
| 9,500,386 B1 * | 11/2016 | Anderson | F24H 9/2071 | |
| 2002/0112495 A1 * | 8/2002 | Campbell | F24F 1/0003 | 62/259.1 |
| 2006/0016335 A1 * | 1/2006 | Cox | B03C 3/09 | 96/15 |
| 2007/0039462 A1 * | 2/2007 | Helt | B03C 3/12 | 95/6 |
| 2007/0039472 A1 * | 2/2007 | Bias | B03C 3/025 | 96/66 |
| 2010/0187321 A1 * | 7/2010 | Bunn | C25B 1/04 | 237/1 R |
| 2010/0242509 A1 * | 9/2010 | Lifson | F24F 3/044 | 62/115 |
| 2012/0205077 A1 * | 8/2012 | Zinger | F24F 5/0071 | 165/104.33 |
| 2014/0090408 A1 * | 4/2014 | Norrell | F24F 11/0012 | 62/187 |
| 2014/0213172 A1 * | 7/2014 | Jameson | F24F 3/044 | 454/284 |

* cited by examiner

HVAC SYSTEM WITH SELECTIVE FLOWPATH

CROSS-REFERENCE TO RELATED APPLICATIONS

The present application claims priority under 35 U.S.C. 119(e) to U.S. Provisional Patent Application No. 61/762,204 filed on Feb. 7, 2013 by Bicknell and entitled "HVAC System with Selective Flowpath," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and/or air conditioning (HVAC) systems may direct air through multiple components even while some of those components are not in use. In some cases, directing air through unused components may be associated with additional power consumption and/or lower HVAC efficiency ratings.

SUMMARY

In some embodiments of the disclosure, a heating, ventilation, and/or air conditioning (HVAC) system is disclosed as comprising a furnace comprising a furnace heat exchanger, and an indoor HVAC unit comprising a refrigerant heat exchanger, wherein at least one of a component of the furnace and a component of the indoor HVAC unit are selectively removable from an airflow path of the HVAC system.

In other embodiments of the disclosure, an HVAC system is disclosed as comprising an airflow path and a component disposed within the airflow path, wherein an orientation of the component is selectively adjustable in response to at least one of a mode of operation of the HVAC system and a temperature of air flowing through the airflow path.

In yet other embodiments of the disclosure, a method of increasing a heating, ventilation, and/or air conditioning (HVAC) system efficiency is disclosed as comprising selectively altering at least one of a position and a presence of a component within an airflow path of an HVAC system in response to a mode of operation of the HVAC system.

DETAILED DESCRIPTION

This disclosure provides, in some embodiments, systems and methods for (1) selectively preventing and/or reducing passage of air through unused heating, ventilation, and/or air conditioning (HVAC) components, (2) increasing an HVAC efficiency rating by preventing and/or reducing passage of air through unused heating, ventilation, and/or air conditioning (HVAC) components, and (3) utilizing active and/or passive features to selectively reduce a flowpath resistance. In some embodiments, an efficiency rating may be increased by utilizing one or more of the above-listed features. In some cases, a rated Seasonal Energy Efficiency Rating (SEER), Energy Efficiency Rating (EER) of the HVAC system, and/or Heating and Seasonal Performance Factor (HSPF) of the HVAC system may be increased relative to a substantially similar HVAC system that does not alter a flowpath as disclosed herein.

Figure 1:
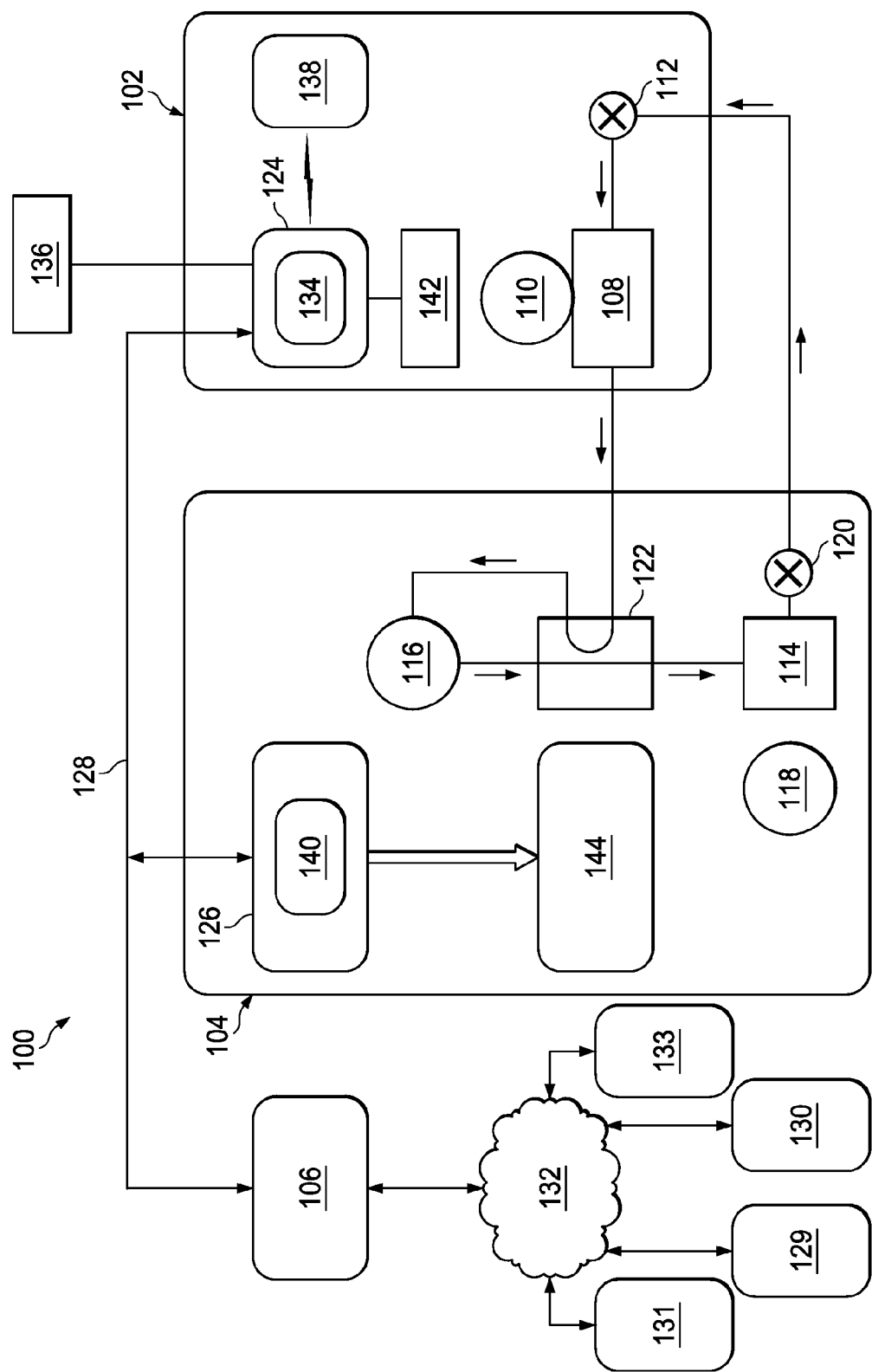
FIG. 1 is a schematic diagram of an HVAC system according to an embodiment of the disclosure.

Referring now to FIG. 1, a schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality. In alternative embodiments, the HVAC system 100 may comprise a type of air-conditioning system that is not a heat pump system.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system 100.

In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other devices 129, 130, 131, 133 via a communication network 132. In some embodiments, the communication network 132 may comprise a telephone network and other devices 129, 130, 131, 133 may comprise a telephone. In some embodiments, the communication network 132 may comprise the Internet and other devices 129, 130, 131, 133 may comprise a so-called smartphone and/or other Internet enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134, or any other suitable information storage device, may comprise information related to the identification and/or operation of the indoor unit 102 and/or a position of the outdoor metering device 120.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
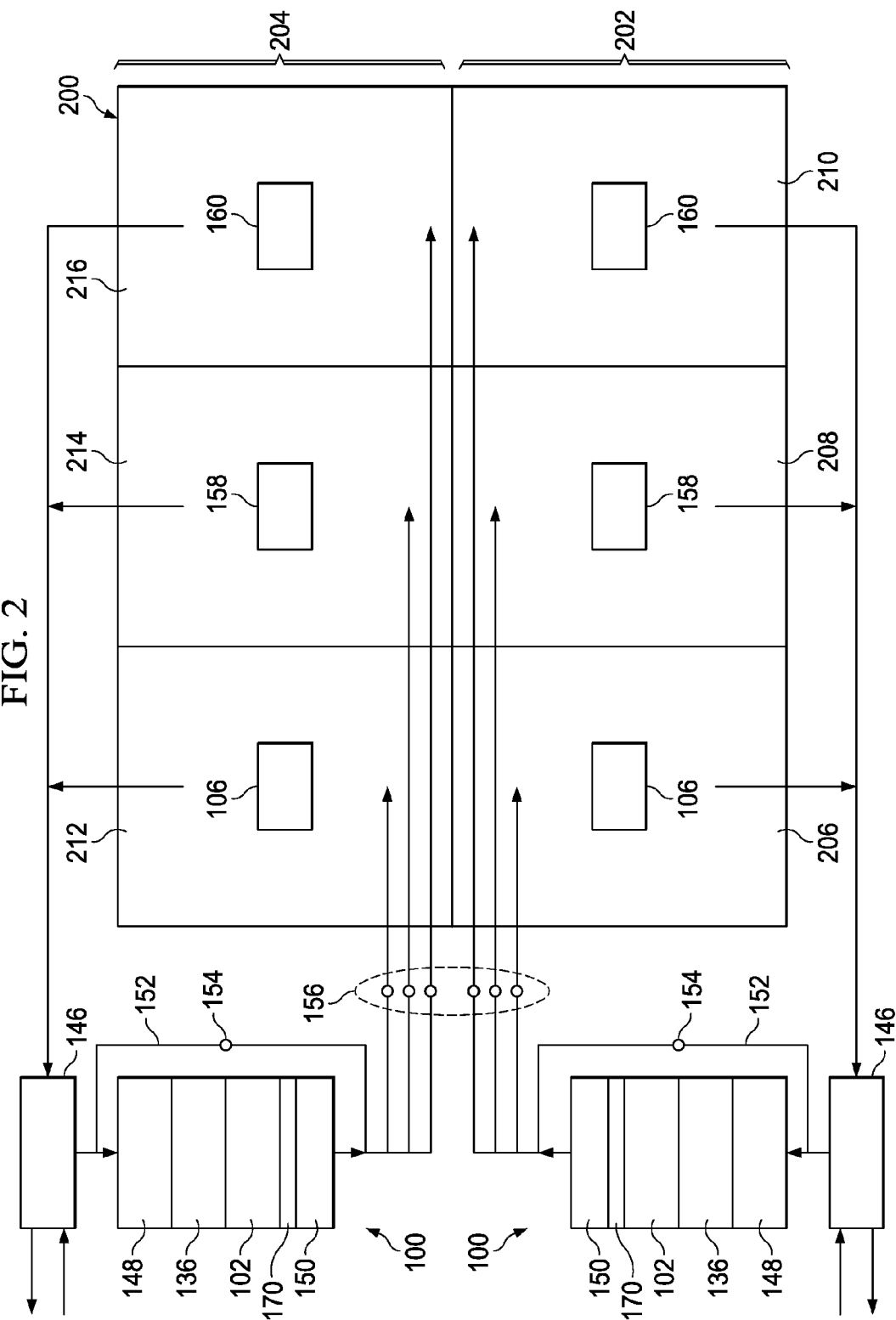
FIG. 2 is a schematic diagram of the air circulation paths of the HVAC system of FIG. 1.

Referring now to FIG. 2, a schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

Still referring to FIG. 2, the system controllers 106 may be configured for bidirectional communication with each other and may further be configured so that a user may, using any of the system controllers 106, monitor and/or control any of the HVAC system 100 components regardless of which zones the components may be associated. Further, each system controller 106, each zone thermostat 158, and each zone sensor 160 may comprise a humidity sensor. As such, it will be appreciated that structure 200 is equipped with a plurality of humidity sensors in a plurality of different locations. In some embodiments, a user may effectively select which of the plurality of humidity sensors is used to control operation of one or more of the HVAC systems 100. In some embodiments, the HVAC systems 100 may further comprise a furnace 170 configured to burn fuel such as, but not limited to, natural gas, heating oil, propane, and/or any other suitable fuel, to generate heat.

Figure 3:
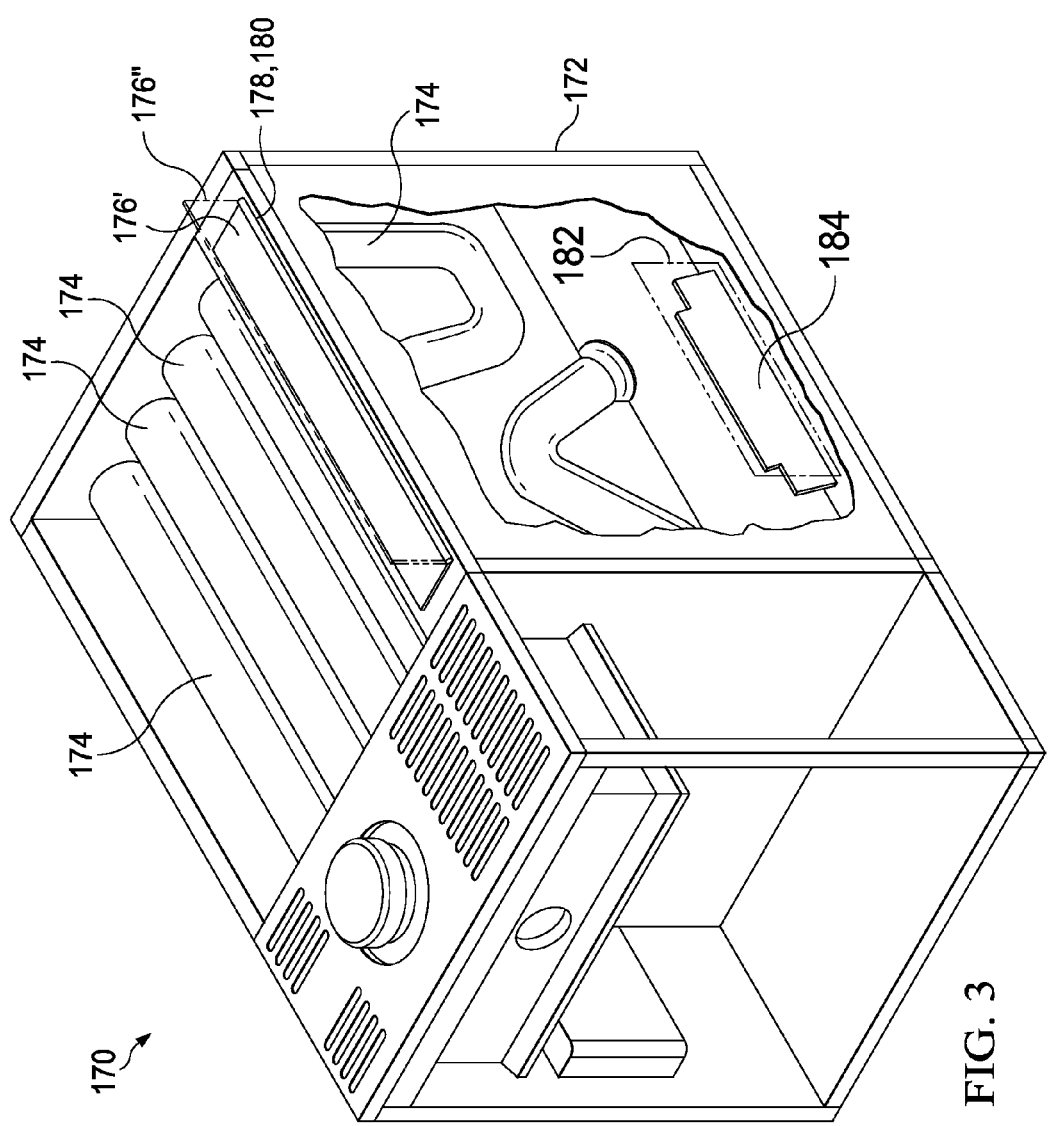
FIG. 3 is an oblique view of a furnace of the HVAC system of FIG. 2.

Referring now to FIG. 3, an oblique view of a furnace 170 is shown according to an embodiment of the disclosure. In some cases, the furnace 170 may comprise a furnace cabinet 172 that substantially envelopes a plurality of heat exchangers 174. In some cases, the furnace 170 may comprise one or more baffles 176 configured to direct air in a manner predefined to at least one of increase efficiency of the furnace 170 and prevent overheating of particular components of the furnace 170. In some cases, the baffles 176 may present an airflow obstruction that generally increases resistance to airflow through the furnace 170. Accordingly, while the baffle 176 may serve a desired purpose during operation of the furnace 170, the baffle 176 may unnecessarily require indoor fan 110 to work harder and/or use more power than would be required if the baffle 176 were not present or were oriented differently. In some embodiments, the baffle 176 may comprise an adjuster 178 configured to allow selective movement of baffle 176 from the operational position shown as 176' for use when furnace 170 is operating to a less obstructive passive position shown as 176" for use when furnace 170 is not operating. In some embodiments, the passive position which is shown as 176" may be a position in which the baffle 176 is oriented relatively more parallel to a local airflow direction of air passing through furnace 170, thereby reducing resistance to passing air through the furnace 170. With such selective orientation of baffle 176, the HVAC system 100 may be provided a higher energy efficiency rating because the energy required to pass air through the furnace 170 is relatively lowered during operation of the HVAC system 100 in a cooling mode. In some cases, the adjuster 178 may comprise a manually operated, motorized, actuated, and/or electronically controlled hinge and/or joint 180 while in other embodiments, the adjuster 178 may comprise a temperature and/or electrical field sensitive bi-metallic and/or electricity responsive material configured to selectively move the baffle 176 between the operational position 176' and the passive position 176". In the case where the baffle 176 position is electronically controlled, the baffle 176 may be moved into the operational position 176' when a call for furnace 170 heating is active and the baffle 176 may be moved into the passive position 176" when the call for furnace 170 heating is inactive and/or when a call for cooling and/or heat pump heating is active.

Similarly, a barrier opening 182 may be selectively provided by moving, removing, and/or otherwise altering and orientation of a barrier 184 that may allow and/or disallow air to bypass and/or pass around the heat exchangers 174 rather than pass between and/or through them. In some embodiments, the barrier opening 182 may be disposed at a first end of the furnace 170, while the baffle 176 may be disposed at an opposite and/or different end of the furnace 170. Further, in some embodiments, when furnace 170 is not operating, an alternative airflow path through the furnace 170 may be created that extends from the barrier opening 182 to an opening created by configuring the baffle 176 in the passive position shown as 176" that may allow an airflow through the furnace 170 to bypass the heat exchangers 174.

Figure 4:
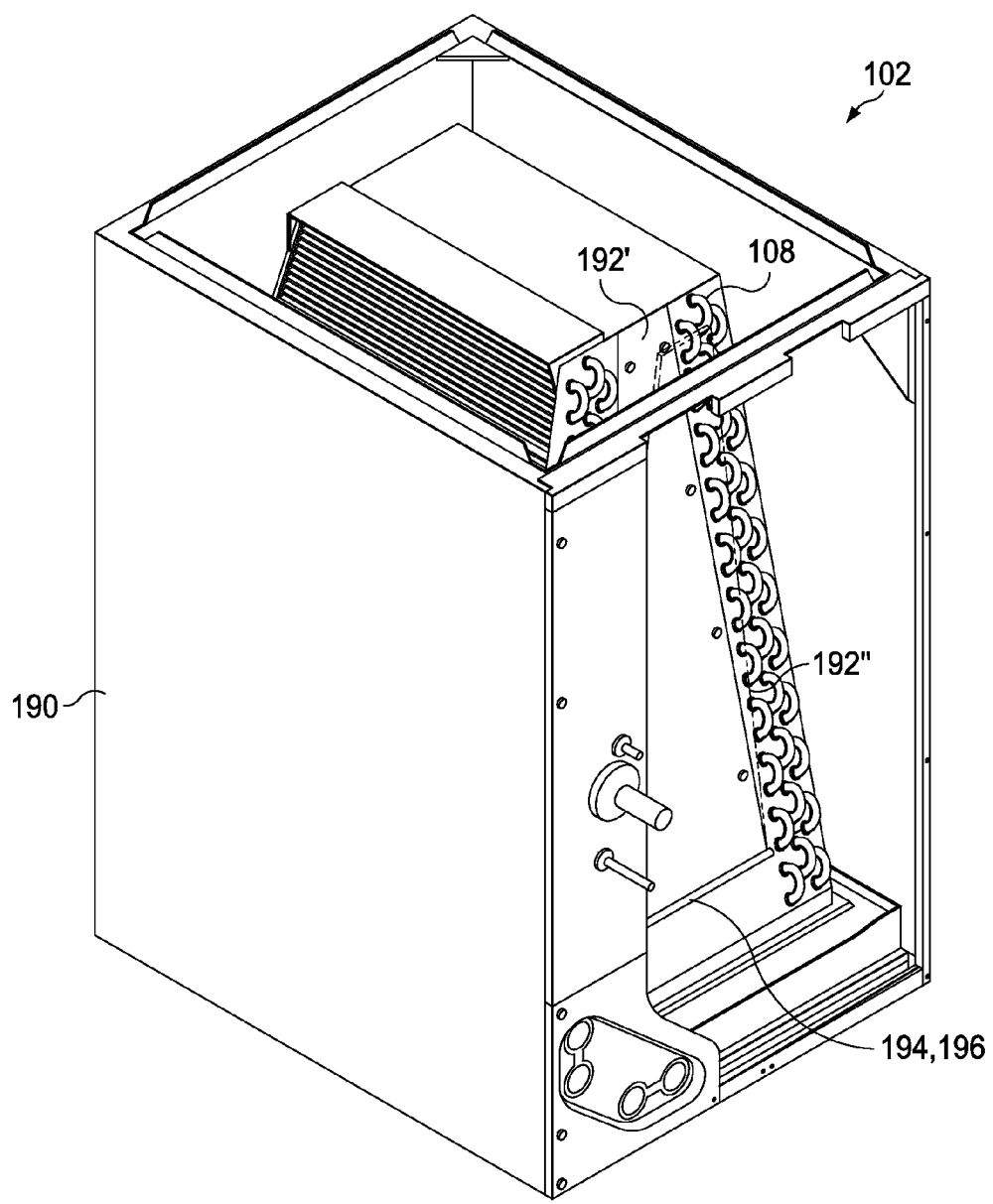
FIG. 4 is an oblique view of an indoor unit of FIG. 2.

Referring now to FIG. 4, an oblique view of an indoor unit 102 is shown according to an embodiment of the disclosure. In some cases, the indoor unit 102 may comprise an indoor unit cabinet 190 that substantially envelopes the indoor heat exchanger 108. In some cases, the indoor unit 102 may comprise one or more barriers 192 configured to direct air through the indoor heat exchanger 108 and to prevent passage of air around the indoor heat exchanger 108. In some cases, passing the air through the indoor heat exchanger 108 may present an airflow obstruction that generally increases resistance to airflow through the indoor unit 102. Accordingly, while the barrier 192 may serve a desired purpose during operation of the indoor heat exchanger 108, the barrier 192 may unnecessarily require indoor fan 110 to work harder and/or use more power than would be required if the barrier 192 were not present or were oriented differently. In some embodiments, the barrier 192 may comprise an adjuster 194 configured to allow selective movement of barrier 192 from the operational position shown as 192' for use when indoor heat exchanger 108 is operating to a less obstructive passive position shown as 192" for use when indoor heat exchanger 108 is not operating. In some embodiments, the passive position which is shown as 192" may be a position in which the barrier 192 allows air to bypass the indoor heat exchanger 108, thereby reducing resistance to passing air through the indoor unit 102. With such selective orientation of barrier 192, the HVAC system 100 may be provided a higher energy efficiency rating because the energy required to pass air through the indoor unit 102 is relatively lowered during operation of the HVAC system 100 in a furnace heating. In some cases, the barrier 192 may comprise a motorized, actuated, and/or electronically controlled hinge and/or joint 196 while in other embodiments, the barrier 192 may comprise a temperature and/or electrical field sensitive bi-metallic and/or electricity responsive material configured to selectively move the barrier 192 between the operational position 192' and the passive position 192". In the case where the barrier 192 position is electronically controlled, the barrier 192 may be moved into the operational position 192' when a call for operation of the indoor heat exchanger 108 is active and the barrier 192 may be moved into the passive position 192" when the call operation of the indoor heat exchanger 108 is inactive and/or when a call for furnace heating is active.

Figure 5:
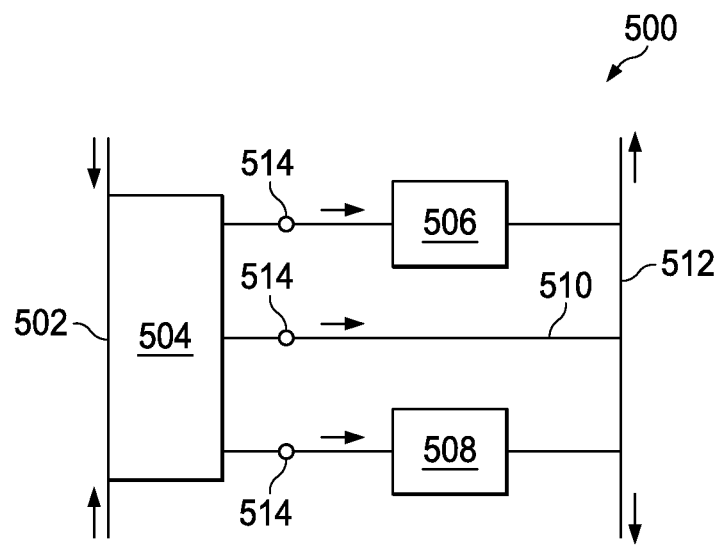
FIG. 5 is a schematic representation of an HVAC system according to another embodiment of the disclosure.

Referring now to FIG. 5, a schematic of an HVAC system 500 is shown according to an embodiment of the present invention. In some embodiments, HVAC system 500 may generally be substantially similar to HVAC system 100. The HVAC system 500 may comprise return plenum 502, a blower 504, an indoor unit 506 comprising a refrigerant heat exchanger, a furnace 508, a bypass duct 510, and a supply plenum 512. In some embodiments, indoor unit 506 may be substantially similar to indoor unit 102. Further, in some embodiments, furnace 508 may be substantially similar to furnace 170. In some embodiments, an airflow path may be selected in response to which of the indoor unit 506 and the furnace 508 are called for use. For example, in some cases, the blower 504 may be moveable and/or selectively associated with only one of the indoor unit 506 and the furnace 508 so that depending on which of the indoor unit 506 and the furnace 508 are operating. In some cases, where the blower 504 is operating but neither the indoor unit 506 nor the furnace 508 are operating, the blower 504 may be aligned with, connected to, and/or otherwise associated with the bypass duct 510 to the exclusion of both of the indoor unit 506 and the furnace 508. Accordingly, the HVAC system 500 may be configured to selectively pass air through only the components necessary for the desired type of HVAC operation and energy savings may be realized as a result of the lowered amount of energy consumed by the blower 504 to move air from the return plenum 502 to the supply plenum 512. In some embodiments, selection of the airflow path may comprise selective opening and closing of dampers 514.

Figure 6:
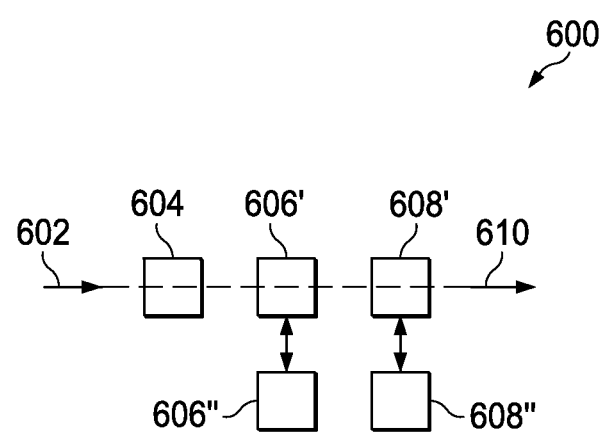
FIG. 6 is a schematic representation of an HVAC system according to yet another embodiment of the disclosure.

Referring now to FIG. 6, a schematic of an HVAC system 600 is shown according to an embodiment of the present invention. In some embodiments, HVAC system 500 may generally be substantially similar to HVAC system 100. The HVAC system 600 may comprise return plenum 602, a blower 604, an indoor unit 606 comprising a refrigerant heat exchanger, a furnace 608, and a supply plenum 610. In some embodiments, indoor unit 606 may be substantially similar to indoor unit 102 and/or indoor unit 506. Further, in some embodiments, furnace 608 may be substantially similar to furnace 170 and/or furnace 608. In this embodiment, a resistance to moving air from the return plenum 602 to the supply plenum 610 may be minimized by selectively mechanically removing one or both of the indoor unit 606 and the furnace 608 from the airflow path. In some embodiments, the removal of the indoor unit 606 and the removal of the furnace 608 from an airflow path may be selected in response to which of the indoor unit 606 and the furnace 608 are called for use. For example, in some cases the indoor unit 606 may be removed from the flowpath while the furnace 608 is in use and the furnace 608 may be removed from the flowpath while the indoor unit 606 is in use. Accordingly, the HVAC system 600 may be configured to selectively pass air through only the components necessary for the desired type of HVAC operation and energy savings may be realized as a result of the lowered amount of energy consumed by the blower 604 to move air from the return plenum 602 to the supply plenum 610.

The discussion below illustrates an example of the impact unnecessarily having a furnace disposed in an airflow may reduce an HVAC system SEER rating. In some cases, a 3 ton and/or 36,000 BTUH HVAC system may comprise an indoor unit that generally requires 2,250 watts to power a blower and force air through the indoor unit and through a refrigerant heat exchanger. In cases where that same HVAC system is coupled with a furnace disposed in the airflow path downstream of the indoor unit and in which gas heat exchangers of the furnace obstruct the passage of air through the furnace, the HVAC system may require an additional 220 watts to pass the air through both the indoor unit and the furnace. In some cases, the additional energy expended may reduce the HVAC system SEER rating from 16 SEER to about 14.57 SEER. Accordingly, in some embodiments, the above-described systems and methods of selectively altering a flowpath and/or altering which components are disposed in a flowpath may provide at least a SEER increase of about 1.43 SEER.

This disclosure contemplates that efficiencies may be gained by selectively orienting and/or removing any HVAC component that is either not in use and/or which may allow bypass of unused components. For example, humidifier components may be selectively removed from an airflow path to reduce and amount of energy required to move air through an HVAC system.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A heating, ventilation, and/or air conditioning (HVAC) system, comprising:
    a furnace comprising a furnace heat exchanger; and
    an indoor HVAC unit comprising a refrigerant heat exchanger and an indoor fan, wherein the indoor fan is configured to generate an airflow through each of the furnace and the indoor unit;
    wherein at least one of the furnace and the indoor HVAC unit comprises a selectively adjustable barrier configured to selectively allow at least a portion of the airflow to bypass at least one of the furnace heat exchanger and the refrigerant heat exchanger.

2. The HVAC system of claim 1, wherein the selectively adjustable barrier is configured to selectively allow at least a portion of the airflow to bypass the furnace heat exchanger.

3. The HVAC system of claim 1, wherein the selectively adjustable barrier is configured to selectively allow at least a portion of the airflow to bypass the refrigerant heat exchanger.

4. The HVAC system of claim 1, wherein the furnace and the indoor HVAC unit are configured to be disposed in different airflow paths.

5. The HVAC system of claim 1, further comprising:
    a bypass duct comprising an airflow path that includes neither the furnace nor the indoor HVAC unit.

6. The HVAC system of claim 1, wherein the selectively adjustable barrier of the furnace comprises an operational position in which substantially all of the airflow passes through the furnace heat exchanger, and the selectively adjustable barrier of the furnace comprises a passive position in which at least a portion of the airflow bypasses the furnace heat exchanger.

7. The HVAC system of claim 1, wherein the selectively adjustable barrier of the indoor HVAC unit comprises an operational position in which substantially all of the airflow passes through the refrigerant heat exchanger, and the selectively adjustable barrier of the indoor HVAC unit comprises a passive position in which at least a portion of the airflow bypasses the refrigerant heat exchanger.

* * * * *